United States Patent
Deckers et al.

(10) Patent No.: US 6,610,797 B1
(45) Date of Patent: Aug. 26, 2003

(54) METHOD FOR PRODUCING ETHYLENE COPOLYMERS IN SEGMENTED TUBULAR REACTORS AND UTILIZING COPOLYMERS AS A FLOW IMPROVER

(75) Inventors: Andreas Deckers, Flomborn (DE); Bernd Wenderoth, Lampertheim (DE); Peter Wedel, Worms (DE); Wilhelm Weber, Neustadt (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/555,804

(22) PCT Filed: Dec. 1, 1998

(86) PCT No.: PCT/EP98/07793

§ 371 (c)(1),
(2), (4) Date: Jun. 5, 2000

(87) PCT Pub. No.: WO99/29748

PCT Pub. Date: Jun. 17, 1999

(30) Foreign Application Priority Data

Dec. 5, 1997 (DE) .......................................... 197 54 039

(51) Int. Cl.[7] ................................................. C08F 2/38
(52) U.S. Cl. ............................ 526/64; 526/65; 526/66; 526/73; 526/227; 526/319; 526/348.2; 526/348.5; 526/348.6; 585/10
(58) Field of Search ............................... 526/64, 65, 66, 526/73, 227, 319, 348.2, 348.5, 348.6; 585/10

(56) References Cited

U.S. PATENT DOCUMENTS

| | | | |
|---|---|---|---|
| 3,627,838 A | | 12/1971 | Ilnyckyj et al. |
| 4,191,821 A | * | 3/1980 | Gloriod ....................... 528/501 |
| 4,230,811 A | | 10/1980 | Ilnyckyj |
| 4,354,011 A | | 10/1982 | Ilnyckyj |
| 5,227,445 A | * | 7/1993 | Berger et al. ................ 526/331 |
| 6,300,430 B1 | * | 10/2001 | Deckers et al. ................ 526/64 |

FOREIGN PATENT DOCUMENTS

DE    25 15 805    4/1975

* cited by examiner

*Primary Examiner*—David W. Wu
*Assistant Examiner*—William Cheung
(74) *Attorney, Agent, or Firm*—Oblon, Spivak, McClelland, Maier & Neustadt, P.C.

(57) ABSTRACT

In a process for preparing ethylene-vinyl acetate copolymers in which a mixture of ethylene and vinyl acetate is polymerized continuously in the presence of free-radical polymerization initiators and, if desired, molecular weight regulators in a cooled tube reactor at a pressure in the range from 1000 to 3500 bar, and the poly-merization initiator is added at the beginning and at two or more points along the tube reactor, and temperature changes in the reaction mixture along the tube reactor, between the first temperature maximum and the last addition of the polymerization initiator, are within a range of not more than 20° C.

26 Claims, 1 Drawing Sheet

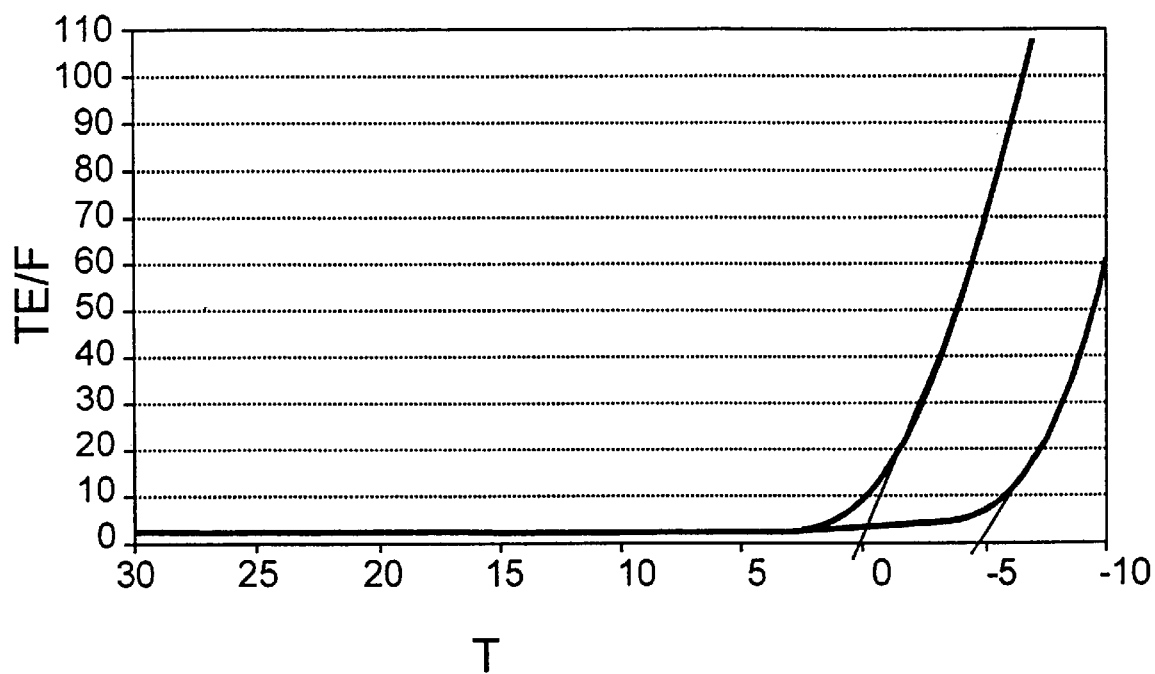

METHOD FOR PRODUCING ETHYLENE COPOLYMERS IN SEGMENTED TUBULAR REACTORS AND UTILIZING COPOLYMERS AS A FLOW IMPROVER

The invention relates to ethylene-vinyl acetate copolymers, to a process for preparing them, to their use as flow improvers, especially in petroleum middle distillates, such as diesel fuels and light heating oils, and to fuel compositions comprising them.

Ethylene-vinyl acetate copolymers have been employed for some time as flow improvers in petroleum middle distillates. Their function in such distillates is, in particular, to lower the cold filter plugging point (CFPP), which is determined in accordance with EN 116. Preparation of the ethylene-vinyl acetate copolymers is generally by polymerization of the monomers using the high-pressure technique. US 3,627,838 describes a process for preparing pour-point improvers which uses ethylene-vinyl acetate copolymers. Ethylene and vinyl acetate are reacted at from 138 to 171° C. and under from 48 to 137 bar in a reactor.

DE-A 25 15 805 describes ethylene copolymers, processes for preparing them, and distillate oils comprising them. The reaction of ethylene and vinyl acetate takes place in an autoclave in cyclohexane as solvent. The temperature during the reaction is about 105° C., and the pressure about 75 kp/cm².

EP-A-0 007 590 describes petroleum middle distillates of enhanced filterability. The petroleum distillates contain, for example, ethylene-vinyl acetate copolymers which are prepared solventlessly from the monomers at from 100 to 350° C. and under from 500 to 2000 bar. The polymers are employed together with a monomer such as vinyl acetate as flow improvers.

The use of stirred autoclaves, in particular, is established in the industrial preparation of the copolymers. The use of tube reactors without backmixing leads in general to more heterogeneous products, since along the tube reactor the reaction mixture passes several times through areas of relatively large increase in temperature following the additions of initiator. The resulting copolymers generally have a broad molecular weight distribution.

It is an object of the present invention to provide a process for preparing ethylene and vinyl acetate copolymers which leads to copolymers having a narrow molecular weight distribution that can be employed with advantage as flow improvers in petroleum middle distillates.

We have found that this object is achieved by providing a process for preparing ethylene-vinyl acetate copolymers in which a mixture of ethylene and vinyl acetate is polymerized continuously in the presence of free-radical polymerization initiators and, if desired, molecular weight regulators in a cooled tube reactor at a pressure in the range from 1000 to 3500 bar, preferably 1200 bar, and where the polymerization initiator is added at the beginning and at two or more points along the tube reactor, and temperature changes in the reaction mixture along the tube reactor, between the first temperature maximum and the last addition of the polymerization initiator, are within a range of not more than 20° C.

It has been found that ethylene-vinyl acetate copolymers having advantageous properties, especially narrow molecular weight distributions, are obtainable if the temperature of the reaction mixture in the tube reactor is held within a very narrow range.

The reaction regime should therefore be as homogeneous as possible along the tube reactor. Normally, a polymerization initiator and, if desired, a molecular weight regulator are added to a monomer mixture of ethylene and vinyl acetate upstream of the tube reactor, and the resulting mixture is polymerized in the tube reactor. At the beginning of the reaction, the temperature first of all increases, before falling again owing to the cooling of the tube reactor. In general, further polymerization initiator is supplied at two or more points along the tube reactor in order to obtain maximum conversions within the tube reactor. Following each addition of the polymerization initiator there is first of all a further increase in temperature, which then falls owing to cooling. It has been found that a rapid sequence of additions of initiator with subsequent short cooling zones along the tube reactor allow a homogeneous reaction regime, i.e. small temperature differences, thereby giving a copolymer having a narrow molecular weight distribution.

With a given level of cooling, the respective amount of the polymerization initiator and the sites of the addition of the initiator along the tube reactor are preferably chosen so that between the first temperature maximum and the last addition of the polymerization initiator the average maximum temperature in the reaction mixture is not more than 15° C., especially not more than 10° C., above the average minimum temperature.

Prior to the first heating, the reaction mixture has a low temperature, which is present when the monomers are mixed. Following the last addition of the polymerization initiator, the reaction mixture is cooled in order to enable the product to be discharged from the reactor. Consequently, in accordance with the invention, the temperature level in the reaction mixture is left as constant as possible between the first heating, i.e. the first attainment of the maximum temperature, and the final cooling of the reaction mixture.

The average maximum temperature of the reaction mixture is preferably in the range from 230 to 250° C., with particular preference from 235 to 245° C. In particular, the average maximum temperature is about 240° C. The average minimum temperature is preferably about 230° C.

Following the initiation at the beginning of the reactor, the internal temperature in the tube reactor rises with particular preference to about 240+/−5° C. The reaction mixture then cools owing to the cooling of the tube reactor (preferably by means of water cooling) to about 230° C. +/−5° C. This is followed by further initiaton to an extent such that the temperature of the reaction mixture rises to about 240° C. +/−5° C. Depending on the reactor length, this procedure is repeated a number of times in order to obtain a high conversion.

Depending on the desired conversion it is possible to vary the number of sites along the tube reactor at which polymerization initiator is added. Polymerization initiator is preferably added at 2 to 6, with particular preference at 3 to 5, sites along the tube reactor.

The pressure in the tube reactor is from 1000 to 3500 bar, preferably from 1200 to 2500 bar.

The length/diameter ratio of the tube reactor is preferably in the range from 10,000 to 50,000, with particular preference from 15,000 to 30,000.

The proportion of vinyl acetate in the reaction mixture is preferably from 15 to 45% by weight, with particular preference from 20 to 35% by weight. The remainder of the reaction mixture constitutes ethylene. The copolymer is therefore preferably composed—apart from residues of a free-radical initiator or molecular weight regulator—of ethylene and vinyl acetate.

Free-radical polymerization initiators which can be employed are any desired such initiators. It is possible to employ peroxides which dissociate to free radicals, preferably organic peroxides, air or oxygen.

Examples of suitable free-radical initiators are organic peroxides, such as peresters, perketals and percarbonates. In particular use is made of tert-butyl perpivalates and/or tert-butyl perisononanoate. The latter can be employed in a molar ratio of from 10:1 to 1:10, preferably from 5:1 to 1:5 and, in particular, about 1:1.

The amount of the free-radical polymerization initiator employed is preferably from 10 to 1000 mol-ppm, with particular preferance from 20 to 100 mol-ppm.

Molecular weight regulators which can be employed are any desired and appropriate molecular weight regulators, such as aliphatic and olefinic hydrocarbons, aliphatic aldehydes, and so on. Particular preference is given to the use of aliphatic aldehydes, especially propionaldehyde. The molecular weight regulator is preferably added to the reaction mixture upstream of the tube reactor. It can also be added together with the polymerization initiator at the various sites along the tube reactor.

The ethylene-vinyl acetate copolymers obtained in accordance with the invention preferably have a quotient Q of weight-average molecular weight ($M_W$) to number-average molecular weight ($M_n$) of from 2.0 to 2.5. Copolymers prepared by known processes generally have a Q of more than 2.6. The melt viscosity of the copolymers of the invention is preferably from 40 to 95 cst, with particular preference from 60 to 80 cst. The melt viscosity is determined using a rotary viscometer in accordance with DIN 53019 at 120° C. The Q values are determined by means of gel permeation chromatography.

With the known copolymers the melt viscosity is more than 100 cst at 120° C. Products known to date and having lower melt viscosities are poorer in their solubility or else in-their effectiveness.

The reaction time in the process of the invention is preferably from 60 to 240 s, with particular preference from 60 to 90 s.

The copolymers of the invention are highly effective flow improvers for petroleum distillates, especially petroleum middle distillates, and preferably fuel compositions. They bring about, in particular, a marked reduction in the cold filter plugging point (CFPP) in accordance with EN 116. Moreover, the cloud points, or temperatures at which clouding of an additive-treated fuel begins, are at markedly lower temperatures than in the case of fuels without additives.

BRIEF DESCRIPTION OF THE DRAWINGS

FIG. 1 shows comparative turbidity measurements for polymers of the invention and for comparison polymers. In the figure, the clouding in turbidity units TU is plotted against the temperature T (in ° C.).

The invention also relates to a fuel composition comprising a major amount of a fuel and an effective flow-improving amount of a copolymer as described above. The proportion of the copolymer in this case is preferably from 0.01 to 5% by weight, with particular preference from 0.001 to 0.2% by weight and, in particular, from 0.01 to 0.1% by weight, based on the fuel composition. Particularly appropriate fuel compositions are middle distillates such as diesel fuels and light heating oils. The invention is illustrated below with reference to examples.

EXAMPLES

Preparing the Ethylene-vinyl Acetate Copolymers

The copolymerization of ethylene and vinyl acetate was conducted in a continuously operated tube reactor having a length of 500 m and an internal diameter of 40 mm. The reaction pressure was constant at 1500 bar. In Example EVA1 the proportion of vinyl acetate was 23% by weight, in EVA2 26% by weight, in EVA3 30% by weight, in EVA4 33% by weight and in the comparative example, Example C1, 30% by weight. The remainder was accounted for by ethylene. The free-radical initiator used was a mixture of tert-butyl perpivalate (TBPP) and tert-butyl perisononanoate (TBPIN) in a molar ratio of 1:1 in solution in isododecane. The amount of initiator was 50 mol-ppm. This initiator was added in equal proportions upstream of the reactor and at three points over the course of the tube reactor. The molecular weight regulator used was propionaldehyde, which was added to the original reaction mixture in an amount of 0.8%.

The temperature in the tube reactor was measured by means of a slidable thermometer. Table 1 below indicates for the 5 products tested the starting temperature upstream of the tube reactor and the maximum and minimum temperatures measured over the course of the tube reactor. For the products EVA1 to EVA4 the addition of initiator also took place at three constant sites in the tube reactor. For the comparative example, Example C1, additional initiation took place only at 2 further points in the reactor, since the length of the reactor was required to achieve a sufficient reduction in temperature in the extended cooling zones. Table 1 also indicates the proportion of vinyl acetate (Vac), the viscosity (visc) of the product, in cst, and the value Q.

TABLE 1

| No. product | Start | Tmax 1 | Tmin 1 | Tmax 2 | Tmin 2 | Tmax 3 | Tmin 3 | Tmax 4 | Vac [%] | Visc [cst] at 120° C. | Q |
|---|---|---|---|---|---|---|---|---|---|---|---|
| EVA1 | 175 | 240 | 234 | 243 | 227 | 239 | 227 | 237 | 23 | 70 | 2.1 |
| EVA2 | 175 | 239 | 231 | 243 | 229 | 242 | 230 | 239 | 26 | 70 | 2.1 |
| EVA3 | 175 | 239 | 232 | 241 | 232 | 239 | 231 | 239 | 30 | 70 | 2.2 |
| EVA4 | 175 | 242 | 229 | 242 | 231 | 240 | 233 | 243 | 33 | 70 | 2.1 |
| C1 | 175 | 245 | 205 | 244 | 206 | 245 | — | — | 30 | 300 | 3.1 |

In the comparative experiment initiation took place only three times, since the length of the reactor was required for the longer cooling zones.

The product mixture was worked up by pressure release to atmospheric. There was no further working up.

Fuel Compositions

The copolymers of the invention were tested in a range of fuel compositions based on petroleum middle distillates of commercial European refinery grade. They had the properties indicated in Table 2 below:

TABLE 2

| | MD1 | MD2 | MD3 | MD4 | MD5 | MD6 |
|---|---|---|---|---|---|---|
| Cloud point CP (° C.) in acc. with ISO-3015 | −3 | −6 | −1 | −4 | −1 | +3 |

TABLE 2-continued

|  | MD1 | MD2 | MD3 | MD4 | MD5 | MD6 |
|---|---|---|---|---|---|---|
| CFPP (° C.) in acc. with EN 116 | 4 | −11 | 4 | −5 | −5 | −2 |
| in acc. with ASTM D 4052 density at 15° C. | 833 | 829 | 834 | 830 | 834 | 847 |
| Sulfur content (ppm) in acc. with EN 24260 | 2800 | 400 | 300 | 410 | 3000 | 1300 |
| Distillation in acc. with ISO 3405: | | | | | | |
| initial boiling (° C.) | 163 | 170 | 159 | 166 | 166 | 164 |
| 10% boiling point (° C.) | 198 | 197 | 203 | 188 | 190 | 209 |
| 20% boiling point (° C.) | 206 | 210 | 224 | 204 | 205 | 229 |
| 50% boiling point (° C.) | 259 | 251 | 274 | 262 | 259 | 279 |
| 70% boiling point (° C.) | 298 | 281 | 301 | 302 | 297 | 315 |
| 90% boiling point (° C.) | 344 | 322 | 338 | 347 | 345 | 356 |
| 95% boiling point (° C.) | 365 | 341 | 353 | 368 | 367 | 372 |
| End of boiling (° C.) | 378 | 357 | 364 | 355 | 374 | 383 |

The 10% boiling point is the temperature at which 10% by volume of the initial mixture has distilled off, and so on correspondingly.

The ethylene-vinyl acetate copolymers EVA1 to EVA4 obtained above, in 50% strength solution in a heavy solvent naphtha solvent, were added to the above petroleum distillates. For comparison purposes, the ethylene-vinyl acetate copolymer obtained in accordance with Example C1 (comparative) was employed, which was a customary commercial copolymer in accordance with EP-A-0 007 590 and was likewise 50% strength in heavy solvent naphtha.

The middle distillates were mixed with the copolymers at 40° C. with stirring and then cooled to room temperature. The amount of additive employed is shown in Table 3 below. Also shown is the cold filter plugging point (CFPP) determined in accordance with EN 116. Results for further middle distillates are set out in Table 4.

TABLE 3

Determining the CFPP [° C.] in accordance with EN 116 in MD1 (CP: −3° C., CFPP: −4° C.)

| | Amount added [ppm] | | |
|---|---|---|---|
| MD1 | 75 | 100 | 150 |
| EVA1 | −9 | −11 | −14 |
| EVA2 | −13 | −17 | −21 |
| EVA3 | −8 | −8 | −17 |
| EVA4 | −7 | −8 | −10 |
| C1 (comparative) | −7 | −7 | −9 |

TABLE 4

Determining the CFPP [° C.] in accordance with EN 116

| | MD: | | | | |
|---|---|---|---|---|---|
| | MD2 | MD3 | MD4 | MD5 | MD6 |
| | Amount added: | | | | |
| | 200 ppm | 150 ppm | 500 ppm | 75 ppm | 75 ppm |
| EVA1 | −7 | | | −10 | −6 |
| EVA2 | −10 | | −17 | −16 | −9 |
| EVA3 | −27 | −11 | −18 | −8 | −6 |
| EVA4 | | −11 | −18 | −8 | −2 |
| C1 (comparative) | −23 | −6 | −15 | −5 | 0 |

The results of Tables 3 and 4 show that the middle distillates treated with the copolymers of the invention as additives show a better CFPP response than the middle distillates to which the comparative additive was added.

Turbidity Measurements

Turbidity measurements were made using a laboratory turbidity photometer, model LTP 5, from Dr. Lange GmbH, Düsseldorf. The instrument measures the turbidity by the 90° scattered light dual beam method. The scattered light, deflected diffusely to all sides by the liquid, is measured at an angle of 90°. The turbidity measurement by the scattered light method is directly and linearly proportional to the particle concentration and is indicated in turbidity units TU/F.

For the measurements which are to be made the original cuvette was replaced by a temperature-controllable measuring cell for which the contents of the cuvette can be cooled under programmed control at a cooling rate of 0.5° C./min with the aid of a PT 100 temperature sensor and external master controller FR 400, program transmitter PD 420 and thermostat UNISTAT from Huber GmbH, Offenburg.

A 1% strength solution in xylene of each of the samples under test was prepared at 50° C. 15 ml of this solution were introduced at 50° C. into the temperature-controllable cuvette and cooled to 30° C. The contents of the cuvette were then cooled at a rate of 0.5° C./min, and the turbidity units were recorded as a function of the temperature. The ethylene-vinyl acetate copolymer EVA3 and the comparison copolymer C1, both of which have a vinyl acetate content of 30% by weight, were tested comparatively.

The results are set out in FIG. 1. As can be seen from FIG. 1, EVA3 has a markedly improved turbidity behavior relative to C1: whereas for C1 the cloud point is at 0° C., it was lowered to −5° C. with EVA3, which results in an improved solubility behavior of the products of the invention.

Surprisingly, despite the reduction in the cloud point and the resulting reduction in the number of crystal nuclei which occur, the copolymers of the invention were found to have the markedly improved CFPP response behavior already described above.

We claim:

1. A process for preparing ethylene-vinyl acetate copolymers in which a mixture of ethylene and vinyl acetate is polymerized continuously in the presence of free-radical polymerization initiators and optional molecular weight regulators in a cooled tube reactor at a pressure in the range from 1000 to 3500 bar, and where the polymerization initiator is added at the beginning and at two or more points along the tube reactor in respective amounts, so that the average maximum temperature in the reaction mixture is not more than 15° C. above the average minimum temperature between the first heating and last addition of the polymerization initiator and temperature changes in the reaction mixture along the tube reactor, between the first temperature maximum and the last addition of the polymerization initiator, are within a range of not more than 20° C.

2. A process claimed in claim 1, wherein the average maximum temperature is in the range from 230 to 250° C.

3. A process claimed in claim 1, wherein the average maximum temperature is 240° C. and the average minimum temperature is 230° C.

4. A process as claimed in claim 1, wherein polymerization initiator is added at from 2 to 6 sites along the tube reactor.

5. A process as claimed in claim 1, wherein the ratio of length to internal diameter of the tube reactor is in the range from 10,000 to 50,000.

6. An ethylene-vinyl acetate copolymer preparable by a process as claimed in claim 1 having a Q in the range from 2.0 to 2.5 and a melt viscosity at 120° C. in the range from 40 to 95 cst.

7. A fuel composition comprising a major amount of a fuel and 0.001 to 5% by weight of a copolymer as claimed in claim 6.

8. A process as claimed in claim 1, wherein the amount of vinyl acetate in the mixture is from 15 to 45% by weight.

9. A process as claimed in claim 8, wherein the amount of vinyl acetate in the mixture is from 20 to 35% by weight.

10. An ethylene-vinyl acetate copolymer preparable by a process as claimed in claim 8 having a Q in the range from 2.0 to 2.5 and a melt viscosity at 120° C. in the range from 40 to 95 cst.

11. An ethylene-vinyl acetate copolymer preparable by a process as claimed in claim 8 having a Q in the range from 2.0 to 2.5 and a melt viscosity at 120° C. in the range from 40 to 95 cst.

12. An ethylene-vinyl acetate copolymer as claimed in claim 6, wherein the melt viscosity at 120° C. is in the range of from 60 to 80 cst.

13. An ethylene-vinyl acetate copolymer as claimed in claim 10, wherein the melt viscosity at 120° C. is in the range of from 60 to 80 cst.

14. An ethylene-vinyl acetate copolymer as claimed in claim 11, wherein the melt viscosity at 120° C. is in the range of from 60 to 80 cst.

15. A fuel composition comprising a major amount of a fuel and 0.001 to 5% by weight of a copolymer as claimed in claim 10.

16. A fuel composition comprising a major amount of a fuel and 0.001 to 5% by weight of a copolymer as claimed in claim 11.

17. A fuel composition comprising a major amount of a fuel and 0.001 to 5% by weight of a copolymer as claimed in claim 12.

18. A fuel composition comprising a major amount of a fuel and 0.001 to 5% by weight of a copolymer as claimed in claim 13.

19. A fuel composition comprising a major amount of a fuel and 0.001 to 5% by weight of a copolymer as claimed in claim 14.

20. A fuel composition comprising a major amount of a fuel and 0.01 to 0.2% by weight of a copolymer as claimed in claim 6.

21. A fuel composition comprising a major amount of a fuel and 0.01 to 0.2% by weight of a copolymer as claimed in claim 10.

22. A fuel composition comprising a major amount of a fuel and 0.01 to 0.2% by weight of a copolymer as claimed in claim 11.

23. A fuel composition comprising a major amount of a fuel and 0.01 to 0.2% by weight of a copolymer as claimed in claim 12.

24. A fuel composition comprising a major amount of a fuel and 0.01 to 0.2% by weight of a copolymer as claimed in claim 13.

25. A fuel composition comprising a major amount of a fuel and 0.01 to 0.2% by weight of a copolymer as claimed in claim 14.

26. A process for preparing ethylene-vinyl acetate copolymers in which a mixture of ethylene and vinyl acetate is polymerized continuously in the presence of free-radical polymerization initiators and optional molecular weight regulators in a cooled tube reactor at a pressure in the range from 1000 to 3500 bar, and where the polymerization initiator is added at the beginning and at two or more points along the tube reactor, wherein after each addition of polymerization initiator except the last addition of polymerization initiator, the temperature along the tube reactor rises and then cools prior to the next addition of polymerization initiator, and temperature changes in the reaction mixture along the tube reactor, between the first temperature maximum and the last addition of the polymerization initiator, are within a range of not more than 20° C.

* * * * *